Nov. 8, 1938.   C. W. CRUMRINE   2,135,963
CAMERA FINDER CONSTRUCTION
Filed May 29, 1937
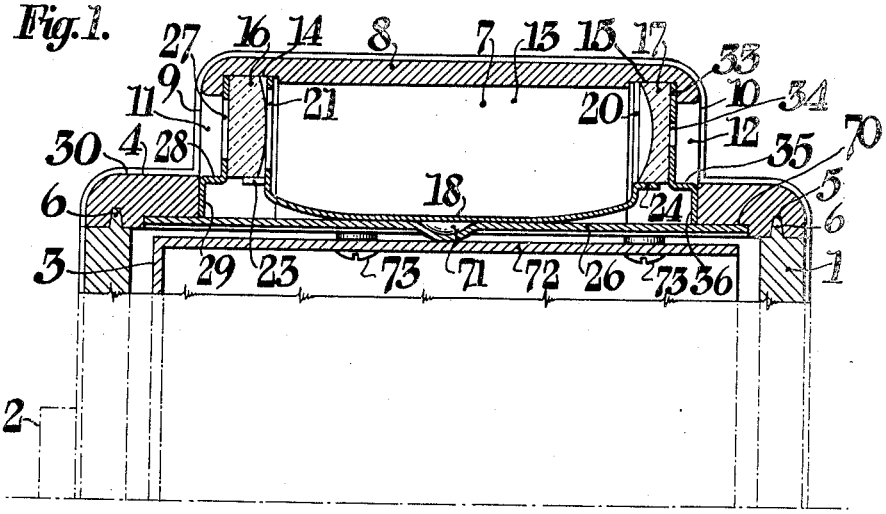
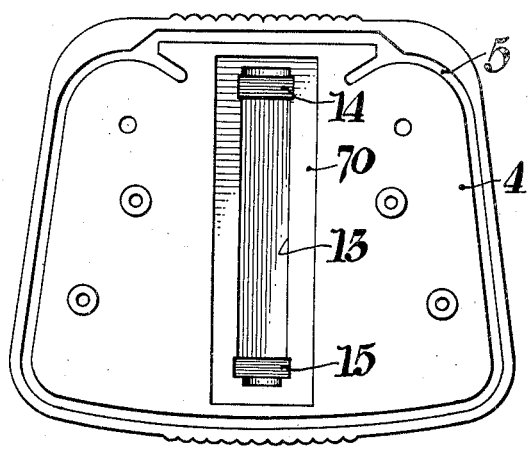
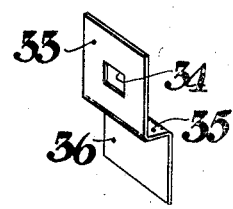
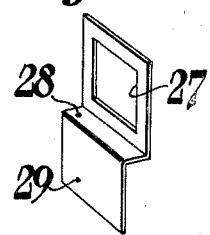
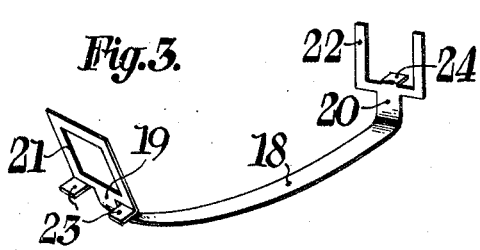
Chester W. Crumrine,
INVENTOR:
BY
ATTORNEYS.

Patented Nov. 8, 1938

2,135,963

UNITED STATES PATENT OFFICE 2,135,963

CAMERA FINDER CONSTRUCTION

Chester W. Crumrine, Rochester, N. Y., assignor to Eastman Kodak Company, Rochester, N. Y., a corporation of New Jersey Application May 29, 1937, Serial No. 145,507

5 Claims. (Cl. 88—1.5)

This invention relates to photography and particularly to view finders for photographic cameras. One object of my invention is to provide an accurate yet inexpensive view finder designed particularly for cameras made of moldable materials. Another object of my invention is to provide a view finder in which negative and positive lenses are used and in which these lenses are properly positioned and held by means of a single spring member and by means of formings in the molded material. Another object of my invention is to provide a view finder, the housing of which can be readily molded of the same material of which the camera is made, and to provide a finder which is simple in construction and which can be readily assembled.

Coming now to the drawing wherein like reference characters denote like parts throughout, Fig. 1 is a sectional view, part being shown diagrammatically in elevation of a camera including a finder constructed in accordance with and embodying a preferred form of my invention.

Fig. 2 is a bottom plan view of the camera top including the finder housing before being assembled.

Fig. 3 is a perspective view of a spring clip for holding the finder elements in place.

Fig. 4 is a perspective view of a front masking element removed from the camera.

Fig. 5 is a similar view of the rear masking element removed from the camera.

My invention is particularly directed to the provision of a finder designed to be used at eye level and including optical elements which will accurately define the field of view of the camera.

In accordance with Fig. 1, the camera body 1 (only half of which is diagrammatically indicated) may be provided with the usual objective in a suitable mount 2 and with a roll holder diagrammatically indicated at 3. The camera is provided with a removable top 4, this top being of the shape shown in Fig. 2 and including a groove 5 extending entirely around the periphery of the top to form a light tight connection with a complementary shaped flange 6 carried by the camera body.

The camera top 4 is provided with a finder housing which consists of side walls 7, a top wall 8 and end walls 9 and 10, both of which are provided with openings 11 and 12. Thus the finder housing is in the form of a projection on the top wall of the camera extending between the front and rear walls of the camera.

As indicated in Fig. 2, the finder housing, which may be designated broadly as 13, is in the form of a groove or channel and the ends of this groove are provided with formings 14 and 15 which are of a shape to receive the finder elements 16 and 17.

Finder element 16 is rectangular in shape and is preferably a plano-convex lens. Finder element 17 is also rectangular in shape and is preferably a plano-concave lens.

In order to hold the finder elements in place, I have provided a spring clip 18 which is roughly U-shaped in cross section. The elongated bottom portion of the spring clip 18, as shown in Fig. 3, may be somewhat curved in cross section and the upstanding ends of the clip 19 and 20 are arranged to press the finder elements resiliently in place. The upstanding arm 19 carries a frame member 21, the edges of which may engage the lens 16, and arm 20 is provided with a frame member 22 which is open at the top and which is adapted to press the lens member 17 in place.

The upstanding arm 19 is also provided with a pair of forwardly projected lugs 23, the function of which is to hold the lens 16 upwardly in place and the upstanding arm 20 has a lug 24 for a similar purpose. Thus, when the two lens elements 16 and 17 have been slipped into their respective slots 14 and 15, preferably with the camera top held upside down as shown in Fig. 2, the spring clip 18 may be positioned so that frames 21 and 22 and the lugs 23 and 24 will position the lens elements 16 and 17, by laying plate 26 in a suitable recess 70 in the top 4 of the camera, this plate 26 being in turn held by the roll holder 3 in the following manner: The plate 26 is provided with a forming 71 which projects downwardly and which is adapted to contact with the top 72 of the roll holder 3 and be held thereby fixedly in position. The roll holder is attached by screws 73 to the top 4 of the camera so that when these screws have been placed as indicated in Fig. 1, the plate 26, spring clip 18, finder elements 16 and 17 and masking plates 27 and 33 are all held in assembled relation. It is desirable, however, to frame the image to be seen through the lens elements and, if desired, the frames shown in Figs. 4 and 5 may be used. Frame 27, shown in Fig. 4, is provided with an offset 28 and a downwardly extending flange 29. This frame may be slipped into the same groove 14 which holds the front finder lens 16 with the face of the frame in contact with the plano side of the lens. The offset portion 28 is so arranged that it will appear to be an extension of the top surface 30 of the camera and the downwardly extending portion 29 is of such a length that it contacts with the top of plate 26 and consequently is held in position by this plate.

Similarly the rear masking plate 33 is provided with a sight opening 34 and with an offset 35 from which an arm 36 extends downwardly. This frame may be slid into the opening 15 which also receives the negative finding lens 17. Since the arm 36 contacts with the plane 26, this part also is held in position by the plate.

The assembling operation for a finder of this type is very simple. With the camera top 4 removed, it may be held upside down as shown in Fig. 2 so that the front mask plate 27 may be slipped into the groove 14 with the square plano-convex lens 16. The plano-convex lens 17 and the rear masking plate 33 may be slipped into the groove 15. After these parts are in place, the spring clip 18 may be flexed so that front frame member 21 with its lugs 23 may be brought into engagement with the finder element 16 at the same time that the rear frame member 22 and lug 24 are brought into engagement with the rear finder element. The frame members 22 and 21 also slide into the grooves 14 and 15 which hold the finder elements and masking members. By merely holding plate 25 in position with the roll holder 3, which is attached to the top 4 by means of screws 13, the spring clip 18 is flexed into the position shown in Fig. 1 in which the finder parts are definitely held in the required position.

Thus, the camera top may be made of a single piece of molded material with the finder housing formed integrally therewith and with the grooves for the reception of the finder elements, masking members and spring clip also formed in the material at the same time.

A finder, constructed as above described, is not only simple to construct but is inexpensive and quite accurate. It is also possible to make these finder elements by molding rather than by the more usual and expensive method of grinding and this still further reduces the cost of the resulting finder. Moreover very good correction can be obtained by making one or more surfaces aspherical as can be readily done by molding.

It is obvious that various changes can be made in the shape and dimensions of the parts and I consider as within the scope of my invention all such forms as may come within the scope of the appended claims.

What I claim:

1. In a box camera, the combination with a camera body, of a top therefore including an elongated housing on the outside thereof extending toward the front and back of the camera including a top and side walls and open on the inside, two formings inside of the housing adapted to receive a positive and a negative finder element, one in each forming, a spring clip having an elongated base and spaced arms adapted to engage and hold the positive and negative finder elements in their respective formings, and means for holding the spring clip in place comprising a plate covering the open inside of the elongated housing.

2. In a box camera, the combination with a camera body, of a top therefore including an elongated housing on the outside thereof extending toward the front and back of the camera and open on the inside, two formings inside of the housing adapted to receive a positive and a negative finder element, one in each forming, a spring clip having an elongated base and arms adapted to engage and hold the positive and negative finder elements in their respective formings, masking plates also seated in the formings holding the negative and positive finder elements and projecting downwardly therefrom and means for holding the finder elements and masking plates in position comprising a cover plate extending over the open inside of the elongated housing engaging the spring clip and the masking plates.

3. In a photographic camera, the combination with a camera body, of a top wall therefore, a finder built into said top wall and comprising a three sided housing, grooves adjacent the two ends of the housing to receive finder elements, a spring clip U-shaped and having lugs extending from the arms thereof for engaging portions of the finder elements to hold said elements in their respective grooves and means including a plate attached to the camera top engaging and holding the U-shaped spring clip in place.

4. In a photographic camera, the combination with a camera body, of a top wall therefore, a finder built into said top wall and comprising a three sided housing, grooves adjacent the two ends of the housing to receive finder elements, a spring clip U-shaped and having lugs extending from the arms thereof for engaging portions of the finder elements to hold said elements in their respective grooves, masking plates also carried by the grooves, one for each finder element, each masking plate including a plate having a masking aperture therein and a shoulder, the length of the masking plates being such as to project downwardly into a position substantially parallel with the bottom of the U-shaped member, and held in place together with the U-shaped clip by a plate attached to the camera top.

5. In a photographic camera, the combination with a camera body, of a top wall therefore, a finder built into said top wall and comprising a three sided housing, grooves adjacent the two ends of the housing to receive finder elements, a negative finder element in one groove, a positive finder element in the other groove a spring clip for holding both finder elements in place comprising an elongated main portion with upturned ends, each end having an opening therein forming frames for engaging the finder elements at the edges of the finder elements, and lugs struck from each upturned end engaging the bottom edges of the finder elements holding them in their grooves, and a plate attached to the camera wall closing the opening beneath the finder housing and engaging the main portion of the spring clip for holding the clip and with it the negative and positive finder elements in assembled position.

CHESTER W. CRUMRINE.